United States Patent [19]

Cohen

[11] Patent Number: 4,870,721
[45] Date of Patent: Oct. 3, 1989

[54] MULTI-PRONG SURFACE CONNECTOR

[76] Inventor: Nathan Cohen, 160 West End Ave., New York, N.Y. 10023

[21] Appl. No.: 320,069

[22] Filed: Mar. 7, 1989

[51] Int. Cl.$^4$ .............................................. B65D 63/00
[52] U.S. Cl. ................................ 24/16 PB; 24/17 AP
[58] Field of Search .............. 24/16 PB, 16 R, 17 AP, 24/30 SP, 20 EE, 20 R, 23 EE; 248/74.3; 292/311, 317, 318, 319, 320, 321, 322, 323

[56] References Cited

U.S. PATENT DOCUMENTS

| | | | |
|---|---|---|---|
| 983,093 | 1/1911 | Svenson | 24/20 EE |
| 2,499,898 | 3/1950 | Anderson . | |
| 3,112,496 | 12/1963 | Dritz | 24/17 AP |
| 3,113,803 | 12/1963 | Struble et al. . | |
| 3,126,665 | 3/1964 | Ciprotti . | |
| 3,447,207 | 6/1969 | Danzer | 24/16 PB |
| 3,514,815 | 6/1970 | Evans | 24/16 PB |
| 3,517,702 | 6/1970 | Mueller et al. | 24/16 PB |
| 3,518,727 | 7/1970 | Eberle et al. | 24/16 PB |
| 3,708,833 | 1/1973 | Ribish et al. . | |
| 3,708,837 | 1/1973 | Chiba . | |
| 3,808,648 | 5/1974 | Billarant . | |
| 4,442,153 | 4/1984 | Meltsch . | |
| 4,581,792 | 4/1986 | Spier | 24/20 EE |

FOREIGN PATENT DOCUMENTS

| | | | |
|---|---|---|---|
| 2927897 | 1/1981 | Fed. Rep. of Germany ... | 24/16 PB |
| 376328 | 5/1964 | Switzerland ..................... | 24/16 PB |

Primary Examiner—Victor N. Sakran
Attorney, Agent, or Firm—Ostrolenk, Faber, Gerb & Soffen

[57] ABSTRACT

A connector arrangement comprising a flexible, preferably molded, preferably plastic sheet having upstanding projections on one surface which are adapted to be received in corresponding, complementary shaped receptacles on the opposite surface of the sheet, such that with the projections in the receptacles, the two surfaces are connected together. The projections may have barbs on them or a ring around them and the receptacles then have cooperating grooves for receiving the barbs or rings for holding the projections in the receptacles. The projections may be conically shaped and the receptacle complementary shaped. The sheet may be of such thickness and the projections and receptacles of such heights that the receptacles extend up into the projections.

16 Claims, 2 Drawing Sheets

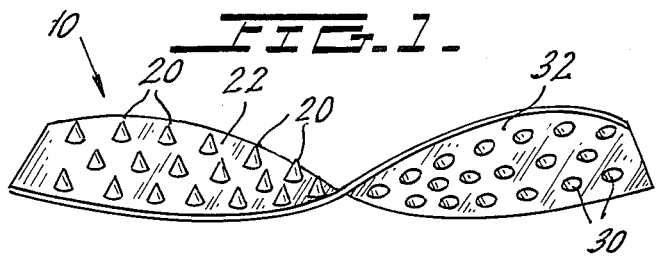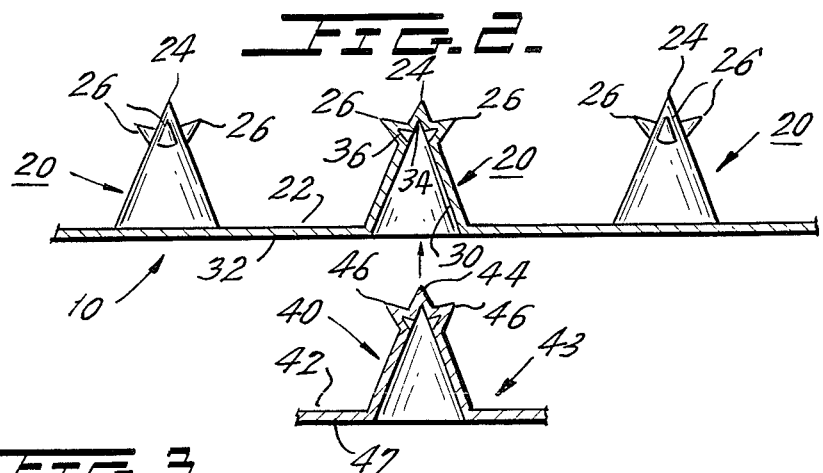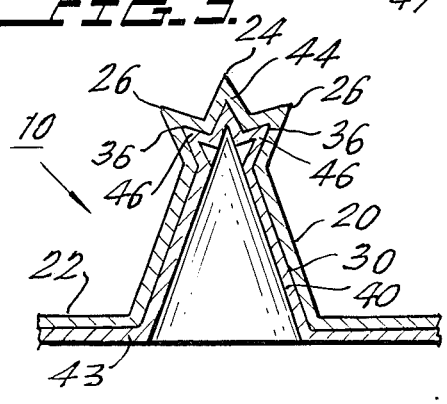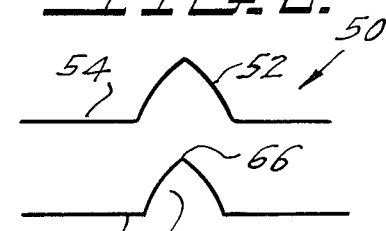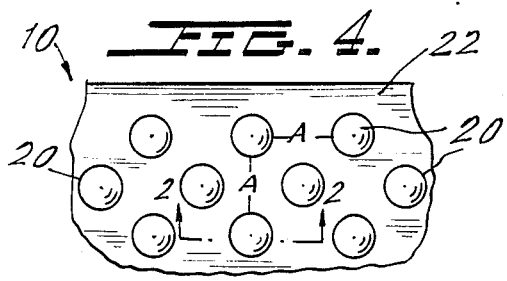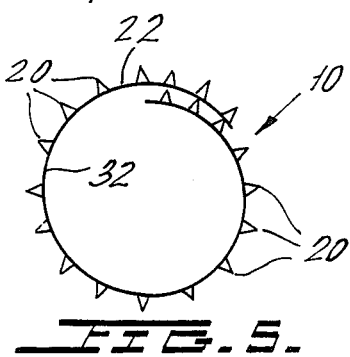

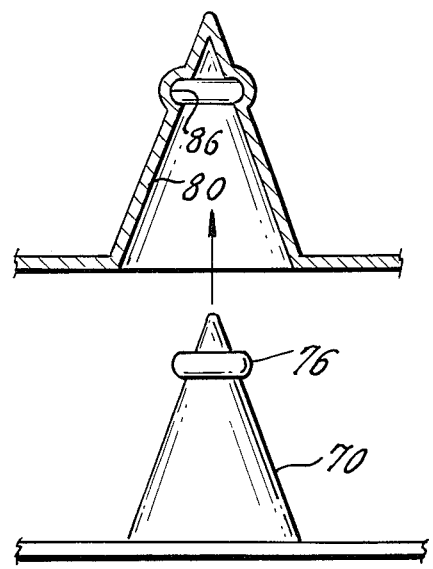

MULTI-PRONG SURFACE CONNECTOR

BACKGROUND OF THE INVENTION

The present invention relates to a connector arrangement for connecting two surfaces, particularly with at least one surface on a flexible sheet, and the connector arrangement enables the sheet to be attached to itself, surface to surface.

Various surface connectors are known. They include conventional adhesive surface connections. They include arrangements wherein surfaces are connected to each other by elements on one surface engaging elements on the facing surface. The surfaces are connected together by being pressed together, are releasable by being pulled apart or peeled apart and may be reconnected together by being again pressed together.

A produce known as Velcro is an example of this type of connector, wherein one facing surface is coated with small filament loops and the cooperating facing surface is coated with small filament hooks. When the cooperating surfaces are pressed together, hooks and loops interengage sufficiently to attach the surfaces. The surfaces are separated, by peeling them apart, particularly by bending one flexible surface away from the other while pulling them apart. This separates the engaged hooks and loops.

Other surface connectors include projections or prongs from one surface which project into openings or receptacles on the cooperating facing surface. These connectors too are separated by their surfaces being pulled or peeled apart. The prongs and cooperating receptacles may be of varying size. The invention concerns a connector arrangement where the prongs and receptacles are individually quite small, and are fairly densely distributed over each surface. A large plurality of the connector elements on the cooperating surfaces provides a firm connection between the surfaces. Examples of these connectors are U.S. Pat. Nos. 2,499,898; 3,708,837; and 3,708,833. Connectors on a somewhat larger scale are shown in U.S. Pat. No. 3,126,665 and 4,442,153. Often the prongs or projections and the receptacles for them are not cooperatingly shaped although they do separably attach to one another. On the other hand, some more effective connectors have cooperation in the shape of the prongs or projections and the respective receptacles, as in U.S. Pat. No. 3,126,665. For many small size prongs cooperating with many small size receptacles, see U.S. Pat. Nos. 3,113,803 and 2,499,898.

Conforming the shapes of the receptacles complementary to the external shapes of the prong helps assure that each prong is securely nested in its receptacle, resists separation of the prongs from their receptacles and thus makes a firm connection between them. Such conformance is known from U.S. Pat. No. 3,808,648, particularly FIG. 12.

In all these prior art structures, the cooperating connecting elements are defined on only one of the surfaces of two sheets of material or two surfaces to be connected, but not on the opposite surfaces of the same sheet. The attachment of flexible material to itself along opposite surfaces, through cooperating, different connectors on the single flexible sheet material is known from U.S. Pat. No. 4,442,153. There is no prior arrangement where projections defined on one surface of a sheet would be cooperatingly received in correspondingly shaped receptacles or openings in the opposite surface of the same connecting sheet, allowing the same sheet to be first folded over or rolled over upon itself and then fastened in any relative orientation of one surface with respect to the other or allowing the same sheet to be used either as the projection surface or the cooperating receptacle surface.

SUMMARY OF THE INVENTION

It is the primary object of the present invention to provide a connection arrangement between two surfaces.

Another object of the invention is to provide such a connection between two surfaces of flexible sheets.

A further object of the invention is to provide a sheet with opposite connectable surfaces.

A still further object is to provide such a sheet with two opposite surfaces which may be connected to each other.

Yet another object of the invention is to provide such a sheet where prongs defined at one surface of the sheet are receivable in cooperating complementary receptacles or recesses in the other surface of the sheet.

The present invention comprises a multi-connector arrangement, wherein projections are defined on one surface of a connector material and cooperating, preferably complementary shaped receptacles are defined on the opposite surface of the connector material, with the projections and the receptacles therefor being cooperatingly, and preferably complementary shaped such that the projections on one surface of the sheet can be securely held in the receptacles on the opposite surface of the sheet and such that the projections can also be released or extracted from the receptacles, and they can be reconnected later, even at a somewhat different relative orientation of the two surface, if that is desired.

Preferably, the connector material is a sheet integrally formed with the projections projecting from one surface and the receptacles defined in the opposite surface. The sheet is flexible, enabling the sheet to be folded over or rolled over so that the sheet may be closed upon itself. Obviously, each surface of the sheet may also be attached to a complementary surface of another sheet.

The receptacles on one surface and the projections on the other surface of a sheet are each uniformly arranged over a substantial portion of their respective surfaces, from a part toward one end of the sheet up to the entire surface of the sheet. The receptacles and projections are in the same generally uniform array over their respective surfaces. This enables the sheet surfaces to be overlaid at various relative orientations.

In a more specific embodiment, the sheet having the projections and receptacles is a molded sheet, preferably of suitable moldable plastic material. The walls of the mold cavity in which the sheet is molded are shaped so that each projection formed on one surface is formed at the same time and in the same location as a cooperatingly shaped projection receiving recess or receptacle in the opposite surface. In particular, the bottom of a receptacle or recess would project to the inside of the respective projection from the other surface. If the sheet is thin enough from surface to surface and the projections and corresponding receptacles are large enough, the sheet may be molded using a mold arrangement such that a prong and the receptacle beneath it are molded at the same time, using the projections and recesses of the mold to produce both together.

The shapes of the prongs and receptacles is a matter of choice. The prongs may vary in shape, e.g. from circular cylindrical drums, other geometric shape drums, rounded elements, as in U.S. Pat. No. 3,808,648, to headed projections, as in U.S. Pat. No. 2,499,898. For the best mode, the inventor contemplates generally conically shaped or frustoconically shaped projections to be received in cooperatingly shaped and sized conical or frustoconical recesses or receptacles.

For enhancing securement of a projection or prong in a receptacle, the prong is provided with one or more securement elements, such as barbs or an annular projecting ring, or the like, along its length and the receptacle or recess is formed with a cooperatingly shaped groove or slot for receiving the barb, ring, etc. to removably hold the projection in its receptacle. The securement element on the projection and the cooperating securement element in the receptacle are soft or flexible enough to deform for enabling initial connection and also subsequent separation.

With a large number of small, short projections arrayed over one surface of a sheet and a correspondingly large number of small complementary receptacles on the opposite surface of the sheet, the surfaces of the sheet can be effectively connected to each other or complementary surfaces of two sheets may be connected at any desired orientation.

Other objects and features of the present invention will become apparent from the following description of the preferred embodiments of the invention considered in conjunction with the accompanying drawings.

BRIEF DESCRIPTION OF THE DRAWINGS

FIG. 1 is a perspective view of a flexible sheet provided with the invention;

FIG. 2 is an enlarged cross-sectional view through the sheet showing a plurality of prongs and receptacles in the sheet according to the invention and showing part of a second sheet to be connected;

FIG. 3 is a cross-sectional view showing the connection of two sheets;

FIG. 4 is a plan view of the sheet;

FIG. 5 shows a sheet connected to itself;

FIG. 6 is a cross-section through an alternate sheet provided with the connectors; and FIG. 7 is a partial cross-section showing another embodiment of a prong for enabling securement into a receptacle.

DESCRIPTION OF THE PREFERRED EMBODIMENTS

The sheet 10 is comprised of a moldable plastic material capable of being conventionally molded in sheet form. The sheet may be pressure or injection molded, may be molded by passing the moldable material through the nip between two heated, appropriately profiled rollers for defining the flatness of the sheet and the projections and recesses therein, or the sheet may be otherwise molded or formed according to techniques well known in the plastic materials forming arts. The sheet 10 is preferably sufficiently thin that it can bend or flex. For instance, it may bend or flex sufficiently to be closed upon itself, as in FIG. 5. The precise thickness of the sheet and its ability to fold over upon itself is a matter of choice.

The sheet 10 has a plurality of projections or prongs 20 molded on and projecting from its top surface 22. As illustrated, the prongs are generally conical in shape, wider at the base and narrowing to the somewhat blunt tip 24. The projections may have other shapes from fully cylindrical to frustoconical, to rounded walled, somewhat ball-like, so long as the projections will cooperate with the below described corresponding receptacles 30 on the opposite surface 32 of the sheet 10.

Conical projections 20 might too easily slide free of cooperating conically shaped side walls of the receptacle 30 which receives the projections. To counter this tendency, each projection 20 is provided with one or a plurality of securement elements, which in this embodiment are in the form of barbs 26 projecting laterally from its surface or surfaces. The barbs are flexible enough so as not to significantly interfere with the introduction of the projection into the cooperating receptacles 30, yet are stiff enough and/or are of sufficiently thick material that they will lodge in the receptacles or in cooperating grooves 36 defined in the receptacles for holding the projections in the cooperating receptacles 30 and for thereby attaching the projection covered surface 22 of the sheet 10 to the receptacle covered surface 32 of the same or another sheet.

On the opposite surface 32 of the sheet 10 are defined a plurality of receptacles or recesses 30. Preferably, there are the same number of receptacles as recesses and a respective receptacle 30 is defined beneath each projection 20. As illustrated in FIG. 2, the interior wall defining each receptacle 30 is complementary in shape to the exterior wall defining the projection 20, and the receptacle 30 has a blunted bottom tip 34 against which the projection tip 24 may rest. Further, there are individual recesses or grooves 36 or perhaps an annular groove 36 inside the side wall of the receptacle 30 placed and adapted for receiving in it or them the barbs or rings 26, such than when the barbs nest in the grooves 36, the projections 20 are held more securely in the receptacles 30, making the connector more effective. The molded material of the sheet 10 is sufficiently soft and flexible and the barbs 26 are short enough and/or the grooves 36 are large enough that when the surfaces at the connector are peeled apart, that is by pulling the projections out of their receptacles, the sheet itself will sufficiently deform that the projections and/or the receptacles will deform, and/or their barbs and grooves will deform enough to enable the separation of the barbs 26 out of the grooves 36.

FIG. 2 shows a projection 40 from the top surface 42 of another sheet 43, which is disposed beneath the recess 30 ready for insertion for effecting a connection. Then, as shown in FIG. 3, with the projection 40 installed in the receptacle 30, the end 44 of the projection 40 rests at the end 34 of the receptacle 30, the barbs 46 engage in the grooves 36 and the outer wall of the projection 40 engages the inner wall of the recess 30.

As indicated above, the shape of the projections 20 and cooperating recesses 30 preferably are complementary, although that is not essential, so long as the projections will securely nest in their receptacles and are likely to be held there so that the connection is effected. Further, the conical shape of the projections and receptacles is a matter of choice with the designer, as is the presence or absence of barbs or the like means for holding the projections in the receptacles.

The arrangement and spacing of the projections 20 over the surface 22 is a matter of choice. The alternate, staggered array of FIG. 4 is one example. Preferably, the projections are arranged uniformly spaced from each other in as many directions as possible, for permitting the surface 32 of the same sheet 10 or the surface 47 of another sheet 43 to be oriented at as many different orientations as possible with respect to the surface 22, with the projections 20 or 40 still being able to extend into and be secured in the receptacles 30. In the arrangement shown in FIG. 4, the adjacent projections are to the extent possible all the same distance apart lengthwise and widthwise, and the same distance apart diagonally.

FIGS. 1 and 5 suggest that both entire surfaces 22 and 32 have the projections 20 and receptacles 30 arrayed across them. But it is only necessary that a substantial enough part of each surface be covered that desired surface to surface connection is obtained (like the partial surface to surface overlap in FIG. 5).

The invention is particularly valuable in that the sheet 10 may be folded or rolled up on itself, as shown in FIG. 5, so that the surface 32 can be connected to the surface 22. In FIG. 5, the projections and receptacles need only be arrayed near the ends of the illustrated sheet, where the ends may overlap, although they can be over both entire surfaces as shown.

In FIG. 2, the recesses 30 underlies the projection 20 and projects up inside the projection 20. The sheet 10 may be thin enough and/or the projections and receptacles may be large enough that the sheet may be molded by an appropriately shaped mold such that a prong on one surface of the mold, which defines the recess 30, cooperates with a cavity on the other surface of the mold, which defines the projection 20, so that the molding of the receptacle molds the respective projection on the opposite surface, and vice versa. However, it is not required that the sheet be this thin and/or that the prongs and receptacles be sized to accomplish that.

In FIG. 6, just as in FIG. 2, the sheet 50 has projections 52 on one surface 54 of the sheet which are complementary in shape to the recesses 62 defined on the opposite surface 64 of the sheet 50. As in the sheet 10, the projections and recesses are placed over one another, for enabling the surface 54 of the one sheet 50 or of another sheet to be overlaid on and secured on the surface 64 of the sheet 50. Yet the sheet 50, while still thin enough to be flexible, is nonetheless thick enough that the bottom 66 of the recess 62 does not extend across the full thickness of the sheet 50 and thus does not enter the bottom of the projection 52.

The securement elements in FIG. 2 are illustrated as barbs. In FIG. 7, the securement element 76 on the projection 70 is an annular ring, essentially unbroken around the periphery of the projection. The cooperating receptacle 80 inside the projection has a ring shaped groove 86, which receives the ring 76 to connect the surfaces as in the other embodiments. The relationship between a cooperating projection and receptacle is shown in FIG. 7.

Other shape securement elements may be apparent so long as they perform the connecting function and permit the separation of the connected surfaces.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A connector sheet comprising a sheet having first and second opposite surfaces;

a plurality of projections defined on and projecting from the first surface; the projections having a first predetermined shape, which is generally uniform from projection to projection; the projections being generally uniformly arrayed and uniformly spaced from each other across a substantial portion of the first surface of the sheet in a plurality of directions, for enabling a variety of orientations of the first surface with a respect to the second surface when the first and second surfaces are brought together;

a plurality of recessed receptacles defined in from the second surface of the sheet; the receptacles being generally complementary in shape to the projections on the first surface of the sheet, such that projections on the first surface are adapted to be fitted into receptacles on the second surface of the same sheet and on a corresponding surface of another of the sheets;

the receptacles being generally uniformly arrayed over a substantial portion of the second surface of the sheet in the same generally uniform array as the projections are distributed over the first surface, such that the first surface can be overlaid on the second surface of the same sheet and on the second surface of another of the sheets and the projections on the one surface will be received in the receptacles on the second surface for connecting the surfaces together.

2. The connector arrangement of claim 1, wherein the projections on the first surface and the receptacles on the second surface are so placed on the respective surfaces that each projection is above a respective receptacle on the sheet.

3. The connector arrangement of claim 2, wherein the sheet is of such thickness and the projections are of such height and the receptacles are of such depth that the bottom of each receptacle in the second side of the sheet extends through the sheet and partially into the projection from the first side of the sheet.

4. The connector arrangement of claim 1, wherein each projection is generally conical in shape and each receptacle is correspondingly conical in shape.

5. The connector arrangement of claim 4, further comprising securement means on each projection extending laterally therefrom for increasing the resistance of the projection from being extracted from a respective receptacle.

6. A connector sheet comprising a sheet having first and second opposite surfaces;

a plurality of projections defined on and projecting outward from the first surface; the projections having a generally conical shape, which is generally uniform from projection to projection; the projections being generally uniformly arrayed across a substantial portion of the first surface of the sheet;

a plurality of recessed receptacles defined in from the second surface of the sheet; the receptacles being correspondingly conical and generally complementary in shape to the projections on the first surface of the sheet, such that the projections on the first surface are adapted to be fitted into the receptacles on the second surface of the same sheet and on a corresponding surface of another of the sheets;

the receptacles being generally uniformly arrayed over a substantial portion of the second surface of the sheet in the same generally uniform array as the projections are distributed over the first surface, such that the first surface can be overlaid on the second surface of the same sheet and on the second surface of another of the sheets and the projections on the one surface will be received in the receptacles on the other surface for connecting the surfaces together;

the projections on the first surface and the receptacles on the second surface are so placed on the respective surfaces that each projection is above a respective receptacle on the sheet;

first securement means on each projection extending laterally for increasing the resistance of the projection from being extracted from a respective receptacle;

second securement means in each receptacle for cooperative engagement with the respective first securement means on the projection disposed in the receptacle, the second securement means being at a depth and at a location in the receptacle corresponding to the location along the projection of the first securement means, such that with the projection fully installed in the respective receptacle, the first and second securement means engage in the receptacle.

7. The connector arrangement of claim 6, wherein the sheet on which the projections and receptacles are defined is an integral flexible sheet of flexible material permitting the sheet to be bent, and the projections are integral with the sheet and of the same flexible material.

8. The connector arrangement of claim 6, wherein the sheet is comprised of a moldable plastic material.

9. The connector arrangement of claim 6, wherein the sheet is foldable upon itself for enabling the first surface thereof to be brought against the second surface thereof so that the projections on the first surface are adapted to be received in the receptacles in the second surface.

10. The connector arrangement of claim 6, wherein the first securement means project laterally from the respective projections and the second securement means comprise a respective groove in the receptacle for receiving the respective first securement means.

11. A connector sheet comprising a sheet having first and second opposite surfaces;

a plurality of projections defined on and projecting outward from the first surface; the projections having a predetermined shape, which is generally uniform from projection to projection; the projections being generally uniformly arrayed across a substantial portion of the first surface of the sheet;

a plurality of recessed receptacles defined in from the second surface of the sheet; the receptacles being generally complementary in shape to the projections on the first surface of the sheet, such that projections on the first surface are adapted to be fitted into receptacles on the second surface of the same sheet and on a corresponding surface of another of the sheets;

the receptacles being generally uniformly arrayed over a substantial portion of the second surface of the sheet in the same generally uniform array as the projections are distributed over the first surface, such that the first surface can be overlaid on the second surface of the same sheet and on the second surface of another of the sheets and the projections on the one surface will be received in the receptacles on the other surface for connecting the surfaces together;

first securement means on each projection extending laterally for resisting removal of the projection from a respective receptacle;

second securement means in each receptacle for cooperative engagement with the respective first securement means on the projection disposed in the receptacle at a depth and at a location in the receptacle corresponding to the location along the projection of the first securement means, such that with the projection fully installed in the respective receptacle, the first and second securement means engage in the receptacle.

12. The connector arrangement of claim 1, wherein the securement means comprises a barb on the side of the projection.

13. The connector arrangement of claim 1, wherein the securement means comprises a ring around the periphery of the projection.

14. The connector arrangement of claim 11, wherein first the securement means comprises a barb on the side of the projection.

15. The connector arrangement of claim 11, wherein the securement means comprises a ring around the periphery of the projection.

16. The connector arrangement of claim 11, wherein the first securement means project laterally from the respective projections and the second securement means comprise a respective groove in the receptacle for receiving the respective first securement means.

* * * * *